(12) United States Patent
Togna et al.

(10) Patent No.: US 8,545,580 B2
(45) Date of Patent: Oct. 1, 2013

(54) CHEMICALLY-MODIFIED MIXED FUELS, METHODS OF PRODUCTION AND USES THEREOF

(75) Inventors: Keith A. Togna, Chester, VA (US);
Craig T. Euen, Chester, VA (US);
Steven W. Weeks, Chesterfield, VA (US); Mohammed I. Loya, Richmond, VA (US); Matthew C. Warren, Richmond, VA (US); Richard H. Kendrick, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/412,094

(22) Filed: Mar. 5, 2012

(65) Prior Publication Data

US 2012/0171630 A1    Jul. 5, 2012

Related U.S. Application Data

(63) Continuation of application No. 11/489,143, filed on Jul. 18, 2006, now abandoned.

(51) Int. Cl.
*C01B 3/00* (2006.01)
*C01B 3/32* (2006.01)
*C10L 3/00* (2006.01)
*B01J 8/00* (2006.01)
*F16C 33/20* (2006.01)
*F23N 1/02* (2006.01)

(52) U.S. Cl.
USPC ....... 48/127.3; 48/127.7; 48/127.9; 48/189.1; 48/197 FM; 431/12

(58) Field of Classification Search
USPC .................. 508/100; 48/127.3, 127.7, 127.9, 48/189.1, 197 FM; 431/12
See application file for complete search history.

(56) References Cited

U.S. PATENT DOCUMENTS

| | | | |
|---|---|---|---|
| 4,289,625 A | 9/1981 | Tarman et al. | |
| 4,568,530 A | 2/1986 | Mandelik et al. | |
| 4,571,384 A | 2/1986 | Morita et al. | |
| 4,576,005 A | 3/1986 | Force | |
| 4,582,475 A | 4/1986 | Hoppie | |
| 4,583,994 A | 4/1986 | Frost et al. | |
| 4,588,427 A | 5/1986 | Yao et al. | |
| 4,592,762 A | 6/1986 | Babu et al. | |
| 4,592,903 A | 6/1986 | Osman et al. | |
| 4,597,788 A | 7/1986 | Apffel | |
| 4,642,125 A | 2/1987 | Burk et al. | |
| 4,664,687 A | 5/1987 | Bauer | |
| 4,690,743 A | 9/1987 | Ethington et al. | |
| 4,699,632 A | 10/1987 | Babu et al. | |
| 4,710,212 A | 12/1987 | Hanson et al. | |
| 4,727,205 A | 2/1988 | Velenyi et al. | |
| 4,727,207 A | 2/1988 | Paparizos et al. | |

(Continued)

*Primary Examiner* — Cephia D Toomer
*Assistant Examiner* — Vishal Vasisth
(74) *Attorney, Agent, or Firm* — Faegre Baker Daniels LLP

(57) ABSTRACT

A chemically-modified mixed fuel includes methane gas from at least two methane-production sources and can be utilized in any process that incorporates a Kellogg Primary Reformer. A method for producing the chemically-modified mixed fuel described herein includes providing a first methane-containing gas from a first methane-production source, providing a second methane-containing gas from a second methane-production source and blending the first methane-containing gas with the second methane-containing gas at a suitable pressure to form a chemically-modified mixed fuel. In some cases, at least one additional methane-containing gas can be provided from at least one additional methane-production source and blended with the chemically-modified fuel.

20 Claims, 3 Drawing Sheets

(56) References Cited

U.S. PATENT DOCUMENTS

| | | |
|---|---|---|
| 4,728,506 A | 3/1988 | Habermehl et al. |
| 4,738,699 A | 4/1988 | Apffel |
| 4,773,255 A | 9/1988 | Malcosky et al. |
| 4,778,498 A | 10/1988 | Hanson et al. |
| 4,781,836 A | 11/1988 | Thiele et al. |
| 4,788,372 A | 11/1988 | Gaffney |
| 4,795,842 A | 1/1989 | Gaffney et al. |
| 4,795,849 A | 1/1989 | Gaffney et al. |
| 4,801,762 A | 1/1989 | Leyshon |
| 4,805,881 A | 2/1989 | Schultz et al. |
| 4,814,534 A | 3/1989 | Devries et al. |
| 4,831,206 A | 5/1989 | Zarchy |
| 4,831,207 A | 5/1989 | O'Keefe et al. |
| 4,831,208 A | 5/1989 | Zarchy |
| 4,833,171 A | 5/1989 | Sweeney |
| 4,842,615 A | 6/1989 | Meyer et al. |
| 4,851,020 A | 7/1989 | Montgomery, IV |
| 4,857,081 A | 8/1989 | Taylor |
| 4,869,819 A | 9/1989 | Thiele et al. |
| 4,875,908 A | 10/1989 | Kikukawa et al. |
| 4,906,447 A | 3/1990 | Schwarzenbek |
| 4,915,619 A | 4/1990 | LaRue |
| 4,921,685 A | 5/1990 | Peters et al. |
| 4,926,001 A | 5/1990 | Alagy et al. |
| 4,960,801 A | 10/1990 | Iglesia et al. |
| 4,961,758 A | 10/1990 | Dobitz |
| 4,973,786 A | 11/1990 | Karra |
| 4,999,030 A | 3/1991 | Skinner et al. |
| 5,011,625 A | 4/1991 | Le Blanc |
| 5,013,334 A | 5/1991 | Maurer |
| 5,026,947 A | 6/1991 | Mazurek |
| 5,033,550 A | 7/1991 | Johnson et al. |
| 5,069,775 A | 12/1991 | Grosboll |
| 5,107,906 A | 4/1992 | Swenson et al. |
| 5,122,299 A | 6/1992 | LeBlanc |
| 5,126,499 A | 6/1992 | Hayakawa et al. |
| 5,131,224 A | 7/1992 | Siewert et al. |
| 5,134,944 A | 8/1992 | Keller et al. |
| 5,138,113 A | 8/1992 | Juguin et al. |
| 5,139,365 A | 8/1992 | Chesner |
| 5,139,542 A | 8/1992 | Sowinski |
| 5,139,543 A | 8/1992 | Sowinski |
| 5,141,533 A | 8/1992 | Sowinski |
| 5,171,333 A | 12/1992 | Maurer |
| 5,174,796 A | 12/1992 | Davis et al. |
| 5,176,887 A | 1/1993 | Subramanian et al. |
| 5,180,570 A | 1/1993 | Lee et al. |
| 5,180,703 A | 1/1993 | Ziebarth et al. |
| 5,208,204 A | 5/1993 | Subramanian et al. |
| 5,214,226 A | 5/1993 | Bauer et al. |
| 5,223,238 A | 6/1993 | Czuppon |
| 5,228,995 A | 7/1993 | Stover |
| 5,229,017 A | 7/1993 | Nimerick et al. |
| 5,232,679 A | 8/1993 | Jha et al. |
| 5,246,550 A | 9/1993 | Peters et al. |
| 5,254,934 A | 10/1993 | Carabetta et al. |
| 5,256,277 A | 10/1993 | Del Rossi et al. |
| 5,260,640 A | 11/1993 | Carabetta et al. |
| 5,269,634 A | 12/1993 | Chynoweth et al. |
| 5,315,831 A | 5/1994 | Goode et al. |
| 5,327,730 A | 7/1994 | Myers et al. |
| 5,336,825 A | 8/1994 | Choudhary et al. |
| 5,360,139 A | 11/1994 | Goode |
| 5,362,454 A | 11/1994 | Cizmer et al. |
| 5,364,606 A | 11/1994 | Hung |
| 5,365,902 A | 11/1994 | Hsu |
| 5,366,945 A | 11/1994 | Kresge et al. |
| 5,385,176 A | 1/1995 | Price |
| 5,385,646 A | 1/1995 | Holiday |
| 5,386,699 A | 2/1995 | Myers et al. |
| 5,387,322 A | 2/1995 | Cialkowski et al. |
| 5,388,456 A | 2/1995 | Kettel |
| 5,390,499 A | 2/1995 | Rhoades et al. |
| 5,409,046 A | 4/1995 | Swenson et al. |
| 5,413,699 A | 5/1995 | Chou |
| 5,413,771 A | 5/1995 | Ziebarth et al. |
| 5,414,190 A | 5/1995 | Forg et al. |
| 5,424,195 A | 6/1995 | Volkwein |
| 5,434,330 A | 7/1995 | Hnatow et al. |
| 5,447,705 A | 9/1995 | Petit et al. |
| 5,447,850 A | 9/1995 | McCann |
| 5,450,205 A | 9/1995 | Sawin et al. |
| 5,453,210 A | 9/1995 | Bardasz et al. |
| 5,457,625 A | 10/1995 | Lim et al. |
| 5,461,023 A | 10/1995 | Chang et al. |
| 5,462,116 A | 10/1995 | Carroll |
| 5,465,583 A | 11/1995 | Goode |
| 5,475,178 A | 12/1995 | Del Rossi et al. |
| 5,490,377 A | 2/1996 | Janes |
| 5,501,722 A | 3/1996 | Toy et al. |
| 5,507,146 A | 4/1996 | Bjerklie |
| 5,523,483 A | 6/1996 | Singh et al. |
| 5,527,464 A | 6/1996 | Bartha et al. |
| 5,535,584 A | 7/1996 | Janes |
| 5,537,827 A | 7/1996 | Low et al. |
| 5,560,819 A | 10/1996 | Taguchi |
| 5,573,737 A | 11/1996 | Balachandran et al. |
| 5,581,997 A | 12/1996 | Janes |
| 5,615,561 A | 4/1997 | Houshmand et al. |
| 5,616,163 A | 4/1997 | Halfter |
| 5,641,327 A | 6/1997 | Leas |
| 5,642,630 A | 7/1997 | Abdelmalek et al. |
| 5,653,282 A | 8/1997 | Hackemesser et al. |
| 5,669,958 A | 9/1997 | Baker et al. |
| RE35,632 E | 10/1997 | Leyshon |
| RE35,633 E | 10/1997 | Leyshon |
| RE35,639 E | 10/1997 | Heyden et al. |
| 5,676,070 A | 10/1997 | Maganas et al. |
| 5,678,408 A | 10/1997 | Janes |
| 5,681,360 A | 10/1997 | Siwajek et al. |
| 5,709,733 A | 1/1998 | Hachisuka et al. |
| 5,711,770 A | 1/1998 | Malina |
| 5,719,097 A | 2/1998 | Chang et al. |
| 5,727,903 A | 3/1998 | Borray et al. |
| 5,733,454 A | 3/1998 | Cummings |
| 5,736,107 A | 4/1998 | Inomata et al. |
| 5,736,116 A | 4/1998 | LeBlanc et al. |
| 5,767,388 A | 6/1998 | Fleischer et al. |
| 5,780,382 A | 7/1998 | Chang et al. |
| 5,816,792 A | 10/1998 | Spencer |
| 5,821,111 A | 10/1998 | Grady et al. |
| 5,842,357 A | 12/1998 | Siwajek et al. |
| 5,852,061 A | 12/1998 | Alexion et al. |
| 5,854,170 A | 12/1998 | Chang et al. |
| 5,855,631 A | 1/1999 | Leas |
| 5,869,013 A | 2/1999 | Tabata et al. |
| 5,883,138 A | 3/1999 | Hershkowitz et al. |
| 5,886,056 A | 3/1999 | Hershkowitz et al. |
| 5,891,404 A | 4/1999 | Ibaraki et al. |
| 5,900,515 A | 5/1999 | Mallinson et al. |
| 5,915,365 A | 6/1999 | Meisinger et al. |
| 5,916,260 A | 6/1999 | Dubar |
| 5,922,974 A | 7/1999 | Davison et al. |
| 5,928,618 A | 7/1999 | Maganas et al. |
| 5,935,489 A | 8/1999 | Hershkowitz et al. |
| 5,942,203 A | 8/1999 | Van Dijk et al. |
| 5,950,732 A | 9/1999 | Agee et al. |
| 5,964,908 A | 10/1999 | Malina |
| 5,964,923 A | 10/1999 | Lokhandwala |
| 5,964,985 A | 10/1999 | Wootten |
| 5,972,834 A | 10/1999 | Ohsaki et al. |
| 5,976,721 A | 11/1999 | Limaye |
| 5,980,596 A | 11/1999 | Hershkowitz et al. |
| 5,980,782 A | 11/1999 | Hershkowitz et al. |
| 5,980,857 A | 11/1999 | Kapoor et al. |
| 5,997,277 A | 12/1999 | Heed et al. |
| 6,011,073 A | 1/2000 | Agee et al. |
| 6,011,192 A | 1/2000 | Baker et al. |
| 6,013,158 A | 1/2000 | Wootten |
| 6,015,450 A | 1/2000 | Joshi et al. |
| 6,021,647 A | 2/2000 | Ameringer et al. |
| 6,034,031 A | 3/2000 | Sata |
| 6,035,550 A | 3/2000 | Okui et al. |
| 6,048,472 A | 4/2000 | Nataraj et al. |

| Patent No. | Kind | Date | Inventor |
|---|---|---|---|
| 6,070,429 | A | 6/2000 | Low et al. |
| 6,074,976 | A | 6/2000 | Tabata et al. |
| 6,077,323 | A | 6/2000 | Nataraj et al. |
| 6,080,904 | A | 6/2000 | Chang et al. |
| 6,090,186 | A | 7/2000 | Spencer |
| 6,105,390 | A | 8/2000 | Bingham et al. |
| 6,106,594 | A | 8/2000 | Chang et al. |
| 6,108,967 | A | 8/2000 | Erickson |
| 6,110,979 | A | 8/2000 | Nataraj et al. |
| 6,111,154 | A | 8/2000 | Mallinson et al. |
| 6,114,400 | A | 9/2000 | Nataraj et al. |
| 6,116,050 | A | 9/2000 | Yao et al. |
| 6,125,653 | A | 10/2000 | Shu et al. |
| 6,129,818 | A | 10/2000 | Sherman |
| 6,137,017 | A | 10/2000 | Stauffer |
| 6,138,464 | A | 10/2000 | Derosier et al. |
| 6,143,098 | A | 11/2000 | Valtolina |
| 6,156,279 | A | 12/2000 | Sherman |
| 6,159,432 | A | 12/2000 | Mallinson et al. |
| 6,161,378 | A | 12/2000 | Hanaoka et al. |
| 6,168,768 | B1 | 1/2001 | Alexion et al. |
| 6,176,224 | B1 | 1/2001 | Wu et al. |
| 6,187,226 | B1 | 2/2001 | Detering et al. |
| 6,205,793 | B1 | 3/2001 | Schimp |
| 6,214,066 | B1 | 4/2001 | Nataraj et al. |
| 6,214,258 | B1 | 4/2001 | Woodward et al. |
| 6,218,439 | B1 | 4/2001 | Kobayashi et al. |
| 6,220,052 | B1 | 4/2001 | Tate, Jr. et al. |
| 6,223,519 | B1 | 5/2001 | Basu et al. |
| 6,232,352 | B1 | 5/2001 | Vidalin |
| 6,235,092 | B1 | 5/2001 | Spencer |
| 6,244,338 | B1 | 6/2001 | Mones |
| 6,248,796 | B1 | 6/2001 | Jackson et al. |
| 6,250,244 | B1 | 6/2001 | Dubar et al. |
| 6,254,775 | B1 | 7/2001 | McElvaney |
| 6,264,820 | B1 | 7/2001 | Lewin et al. |
| 6,267,912 | B1 | 7/2001 | Hershkowitz et al. |
| 6,274,096 | B1 | 8/2001 | Thiebaut et al. |
| 6,277,338 | B1 | 8/2001 | Agee et al. |
| 6,290,755 | B1 | 9/2001 | Chang et al. |
| 6,291,232 | B1 | 9/2001 | Miller, III |
| 6,293,978 | B2 | 9/2001 | Kleefisch et al. |
| 6,296,766 | B1 | 10/2001 | Breckenridge |
| 6,298,651 | B1 | 10/2001 | Iijima |
| 6,298,652 | B1 | 10/2001 | Mittricker et al. |
| 6,308,553 | B1 | 10/2001 | Bonne et al. |
| 6,309,612 | B1 | 10/2001 | Balachandran et al. |
| 6,311,629 | B1 | 11/2001 | Marschner et al. |
| 6,312,660 | B1 | 11/2001 | Yagi et al. |
| 6,328,854 | B1 | 12/2001 | Sherman et al. |
| 6,340,437 | B1 | 1/2002 | Yagi et al. |
| 6,350,394 | B1 | 2/2002 | Ennis et al. |
| 6,353,133 | B1 | 3/2002 | Thiebaut et al. |
| 6,355,456 | B1 | 3/2002 | Hallberg et al. |
| 6,367,286 | B1 | 4/2002 | Price |
| 6,375,691 | B1 | 4/2002 | Zucchelli et al. |
| 6,376,423 | B2 | 4/2002 | Yagi et al. |
| 6,380,444 | B1 | 4/2002 | Bjerrum et al. |
| 6,387,281 | B2 | 5/2002 | Millard et al. |
| 6,390,075 | B1 | 5/2002 | Yamazaki et al. |
| 6,393,821 | B1 | 5/2002 | Prabhu |
| 6,395,197 | B1 | 5/2002 | Detering et al. |
| 6,397,582 | B1 | 6/2002 | Hanaoka et al. |
| 6,397,790 | B1 | 6/2002 | Collier, Jr. |
| 6,401,698 | B1 | 6/2002 | Yamazaki et al. |
| 6,402,813 | B2 | 6/2002 | Monereau et al. |
| 6,425,263 | B1 | 7/2002 | Bingham et al. |
| 6,434,948 | B1 | 8/2002 | Eide et al. |
| 6,444,012 | B1 | 9/2002 | Dolan et al. |
| 6,446,014 | B1 | 9/2002 | Ocondi |
| 6,450,256 | B2 | 9/2002 | Mones |
| 6,451,589 | B1 | 9/2002 | Dvorak |
| 6,454,944 | B1 | 9/2002 | Raven |
| 6,460,565 | B1 | 10/2002 | Titus |
| 6,481,207 | B2 | 11/2002 | Miura et al. |
| 6,481,217 | B1 | 11/2002 | Okazaki et al. |
| 6,489,787 | B1 | 12/2002 | McFadden |
| 6,490,866 | B1 | 12/2002 | Cummings |
| 6,492,290 | B1 | 12/2002 | Dyer et al. |
| 6,494,191 | B2 | 12/2002 | Bingham et al. |
| 6,497,457 | B1 | 12/2002 | Stolarczyk |
| 6,500,313 | B2 | 12/2002 | Sherwood |
| 6,503,295 | B1 | 1/2003 | Koros et al. |
| 6,508,209 | B1 | 1/2003 | Collier, Jr. |
| 6,509,566 | B1 | 1/2003 | Wamsley et al. |
| 6,523,351 | B2 | 2/2003 | Mittricker et al. |
| 6,531,630 | B2 | 3/2003 | Vidalin |
| 6,544,439 | B1 | 4/2003 | Lewis et al. |
| 6,553,808 | B2 | 4/2003 | Bonne et al. |
| 6,562,088 | B2 | 5/2003 | Ukai et al. |
| 6,578,559 | B2 | 6/2003 | Kilmer |
| 6,584,780 | B2 | 7/2003 | Hibino et al. |
| 6,585,784 | B1 | 7/2003 | Mittricker |
| 6,599,491 | B2 | 7/2003 | Vidalin |
| 6,602,481 | B2 | 8/2003 | Ohtsuka et al. |
| 6,604,051 | B1 | 8/2003 | Morrow et al. |
| 6,610,124 | B1 | 8/2003 | Dolan et al. |
| 6,612,269 | B2 | 9/2003 | Heffel et al. |
| 6,613,126 | B2 | 9/2003 | Tange et al. |
| 6,619,273 | B2 | 9/2003 | Bingham et al. |
| 6,629,413 | B1 | 10/2003 | Wendt et al. |
| 6,632,362 | B2 | 10/2003 | Miller, III |
| 6,638,416 | B2 | 10/2003 | Wang et al. |
| 6,640,586 | B1 | 11/2003 | Baudat et al. |
| 6,653,516 | B1 | 11/2003 | Yoshikawa et al. |
| 6,653,517 | B2 | 11/2003 | Bullock |
| 6,663,681 | B2 | 12/2003 | Kindig et al. |
| 6,667,347 | B2 | 12/2003 | O'Rear et al. |
| 6,670,058 | B2 | 12/2003 | Muradov |
| 6,684,644 | B2 | 2/2004 | Mittricker et al. |
| 6,685,754 | B2 | 2/2004 | Kindig et al. |
| 6,691,531 | B1 | 2/2004 | Martinez et al. |
| 6,692,544 | B1 | 2/2004 | Grillenzoni |
| 6,692,554 | B1 | 2/2004 | Leffel et al. |
| 6,692,711 | B1 | 2/2004 | Alexion et al. |
| 6,698,237 | B2 | 3/2004 | Gaskin |
| 6,715,339 | B2 | 4/2004 | Bonne et al. |
| 6,716,269 | B1 | 4/2004 | Graff et al. |
| 6,730,350 | B2 | 5/2004 | Finkelshtain et al. |
| 6,733,552 | B1 | 5/2004 | Taguchi et al. |
| 6,733,573 | B2 | 5/2004 | Lyon |
| 6,750,453 | B1 | 6/2004 | Nelson et al. |
| 6,751,958 | B1 | 6/2004 | Wright et al. |
| 6,753,353 | B2 | 6/2004 | Jackson et al. |
| 6,755,965 | B2 | 6/2004 | Pironti et al. |
| 6,757,591 | B2 | 6/2004 | Kramer |
| 6,758,060 | B2 | 7/2004 | O'Brien |
| 6,775,971 | B1 | 8/2004 | Soland |
| 6,781,014 | B1 | 8/2004 | Vidalin et al. |
| 6,783,877 | B2 | 8/2004 | Shimazu et al. |
| 6,790,359 | B2 | 9/2004 | Miller, III |
| 6,796,369 | B2 | 9/2004 | DiMartino, Sr. |
| 6,797,325 | B2 | 9/2004 | Wang et al. |
| 6,797,420 | B2 | 9/2004 | Ukai et al. |
| 6,800,665 | B1 | 10/2004 | Shikada et al. |
| 6,817,427 | B2 | 11/2004 | Matsuo et al. |
| 6,818,028 | B2 | 11/2004 | Barnett et al. |
| 6,818,198 | B2 | 11/2004 | Singh et al. |
| 6,820,689 | B2 | 11/2004 | Sarada |
| 6,824,224 | B1 | 11/2004 | Guadagno |
| 6,832,485 | B2 | 12/2004 | Sugarmen et al. |
| 6,844,292 | B1 | 1/2005 | Okada et al. |
| 6,855,272 | B2 | 2/2005 | Burlingame et al. |
| 6,855,852 | B1 | 2/2005 | Jackson et al. |
| 6,858,049 | B2 | 2/2005 | Mittricker |
| 6,860,257 | B2 | 3/2005 | Wood |
| 6,866,779 | B1 | 3/2005 | Burke |
| 6,875,411 | B2 | 4/2005 | Sanfilippo et al. |
| 6,878,664 | B1 | 4/2005 | Finkelshtain et al. |
| 6,880,344 | B2 | 4/2005 | Radcliff et al. |
| 6,887,446 | B2 | 5/2005 | Ohtsuka et al. |
| 6,892,522 | B2 | 5/2005 | Brasz et al. |
| 6,892,815 | B2 | 5/2005 | Stolarczyk |
| 6,896,717 | B2 | 5/2005 | Pinnau et al. |
| 6,905,600 | B2 | 6/2005 | Lee, Jr. |
| 6,907,737 | B2 | 6/2005 | Mittricker et al. |
| 6,911,161 | B2 | 6/2005 | Xu et al. |
| 6,913,638 | B2 | 7/2005 | Sumida et al. |

| Patent Number | Date | Inventor(s) |
|---|---|---|
| 6,913,735 B2 | 7/2005 | Imasaki et al. |
| 6,916,361 B2 | 7/2005 | Jackson et al. |
| 6,921,597 B2 | 7/2005 | Keefer et al. |
| 6,929,680 B2 | 8/2005 | Krushnevych et al. |
| 6,929,753 B1 | 8/2005 | Falcon |
| 6,932,155 B2 | 8/2005 | Vinegar et al. |
| 6,942,030 B2 | 9/2005 | Zupanick |
| 6,942,719 B2 | 9/2005 | Stewart |
| 6,942,798 B2 | 9/2005 | Miller, III |
| 6,942,998 B1 | 9/2005 | Ooteghem |
| 6,946,017 B2 | 9/2005 | Leppin et al. |
| 6,953,028 B2 | 10/2005 | Bingham et al. |
| 6,956,371 B2 | 10/2005 | Prammer |
| 6,959,764 B2 | 11/2005 | Preston |
| 6,962,056 B2 | 11/2005 | Brasz et al. |
| 6,964,298 B2 | 11/2005 | Zupanick |
| 6,972,119 B2 | 12/2005 | Taguchi et al. |
| 6,973,968 B2 | 12/2005 | Pfefferle |
| 6,976,533 B2 | 12/2005 | Zupanick et al. |
| 6,978,837 B2 | 12/2005 | Yemington |
| 6,986,266 B2 | 1/2006 | Narinsky |
| 6,986,388 B2 | 1/2006 | Zupanick et al. |
| 6,988,492 B2 | 1/2006 | Shetley |
| 6,991,047 B2 | 1/2006 | Zupanick |
| 6,991,048 B2 | 1/2006 | Zupanick |
| 6,995,846 B2 | 2/2006 | Kalayeh et al. |
| 6,997,055 B2 | 2/2006 | DiFoggio |
| 6,997,703 B2 | 2/2006 | Kurashima et al. |
| 6,998,098 B2 | 2/2006 | Allison |
| 7,005,405 B2 | 2/2006 | Suenaga et al. |
| 7,014,822 B1 | 3/2006 | Shinke et al. |
| 7,024,885 B2 | 4/2006 | Villalobos |
| 7,025,137 B2 | 4/2006 | Zupanick |
| 7,025,154 B2 | 4/2006 | Zupanick |
| 7,025,803 B2 | 4/2006 | Wascheck et al. |
| 7,033,822 B2 | 4/2006 | Maston |
| 7,044,113 B2 | 5/2006 | Bingham et al. |
| 7,045,231 B2 | 5/2006 | Coors |
| 7,048,049 B2 | 5/2006 | Zupanick |
| 7,059,277 B2 | 6/2006 | Matsuoka |
| 7,060,233 B1 | 6/2006 | Srinivas et al. |
| 7,060,653 B2 | 6/2006 | Nakamura |
| 7,066,207 B2 | 6/2006 | Lane et al. |
| 7,066,283 B2 | 6/2006 | Livingstone |
| 7,073,595 B2 | 7/2006 | Zupanick et al. |
| 7,073,597 B2 | 7/2006 | Williams |
| 7,074,033 B2 | 7/2006 | Neary |
| 7,078,005 B2 | 7/2006 | Smith et al. |
| 7,080,686 B2 | 7/2006 | Beckhardt |
| 7,220,505 B2 | 5/2007 | Malhotra et al. |
| 2001/0000889 A1 | 5/2001 | Yadav et al. |
| 2001/0023853 A1 | 9/2001 | Millard et al. |
| 2001/0025449 A1 | 10/2001 | Filippi |
| 2002/0029513 A1 | 3/2002 | Shaw |
| 2002/0029770 A1 | 3/2002 | Heffel et al. |
| 2002/0085963 A1 | 7/2002 | Vidalin |
| 2002/0098132 A1 | 7/2002 | Vidalin |
| 2002/0139049 A1 | 10/2002 | Kindig et al. |
| 2002/0148778 A1 | 10/2002 | Raven |
| 2002/0160238 A1 | 10/2002 | Labinov et al. |
| 2003/0006129 A1 | 1/2003 | Imasaki et al. |
| 2003/0008381 A1 | 1/2003 | Augenstein |
| 2003/0027096 A1 | 2/2003 | Barnett et al. |
| 2003/0064011 A1 | 4/2003 | Burlingame et al. |
| 2003/0084668 A1 | 5/2003 | Mittricker et al. |
| 2003/0097843 A1 | 5/2003 | Sugarmen et al. |
| 2003/0121851 A1 | 7/2003 | Lee, Jr. |
| 2003/0154651 A1 | 8/2003 | Shaw |
| 2003/0188536 A1 | 10/2003 | Mittricker |
| 2003/0190503 A1 | 10/2003 | Kumar et al. |
| 2004/0057898 A1 | 3/2004 | Singh et al. |
| 2004/0069942 A1 | 4/2004 | Fujisawa et al. |
| 2004/0103782 A1 | 6/2004 | Wascheck et al. |
| 2004/0177555 A1 | 9/2004 | Knez et al. |
| 2004/0182002 A1 | 9/2004 | Malhotra et al. |
| 2004/0194921 A1 | 10/2004 | DiMartino, Sr. |
| 2004/0204315 A1 | 10/2004 | Krumpelt et al. |
| 2004/0205995 A1 | 10/2004 | Zucchelli et al. |
| 2004/0206065 A1 | 10/2004 | Mittricker et al. |
| 2004/0224396 A1 | 11/2004 | Maston |
| 2004/0244279 A1 | 12/2004 | Briscoe et al. |
| 2005/0013768 A1 | 1/2005 | Malhotra et al. |
| 2005/0016725 A1 | 1/2005 | Pfefferle |
| 2005/0042166 A1 | 2/2005 | Kindig et al. |
| 2005/0061001 A1 | 3/2005 | Maston |
| 2005/0061029 A1 | 3/2005 | Narinsky |
| 2005/0066815 A1 | 3/2005 | Krushnevych et al. |
| 2005/0082058 A1 | 4/2005 | Bustin et al. |
| 2005/0084393 A1 | 4/2005 | Arnaud et al. |
| 2005/0086864 A1 | 4/2005 | Burlingame et al. |
| 2005/0089456 A1 | 4/2005 | Hanaoka et al. |
| 2005/0103498 A1 | 5/2005 | Yemington |
| 2005/0161217 A1 | 7/2005 | Wittle et al. |
| 2005/0189211 A1 | 9/2005 | Morton |
| 2005/0189212 A1 | 9/2005 | Morton |
| 2005/0204625 A1 | 9/2005 | Briscoe et al. |
| 2005/0274075 A1 | 12/2005 | Freund et al. |
| 2005/0274668 A1 | 12/2005 | Lee, Jr. |
| 2005/0287053 A1 | 12/2005 | Sakai et al. |
| 2006/0002840 A1 | 1/2006 | Barnett et al. |
| 2006/0036123 A1 | 2/2006 | Hughes |
| 2006/0060525 A1 | 3/2006 | Hoffland |
| 2006/0074269 A1 | 4/2006 | Hughes |
| 2006/0120953 A1 | 6/2006 | Okuyama et al. |
| 2007/0066495 A1 | 3/2007 | Macpherson |

CHEMICALLY-MODIFIED MIXED FUELS, METHODS OF PRODUCTION AND USES THEREOF

CROSS REFERENCE TO RELATED APPLICATIONS

This application is a CON of Ser. No. 11/489,143, filed Jul. 18, 2006, now abandoned.

FIELD OF THE SUBJECT MATTER

The field of the subject matter disclosed herein is chemically-modified mixed fuels comprising at least one natural gas source. Methods of production of these fuels and appropriate uses are also disclosed.

BACKGROUND

New and modified fuels are being investigated for both their abilities to efficiently and effectively provide energy, while at the same time lowering the cost of acquiring and utilizing the fuel. Obviously, fuel that is provided from renewable or consistent resources will be the most cost efficient option in the long-term, but the fuel should be accessible and relatively easy to use from the standpoint that it is clean fuel which is provided in its usable form.

One process that uses fuel is the synthesis of ammonia. A Kellogg Reforming System or Kellogg Primary Reformer, as shown in Prior Art FIG. 1, can be utilized in the formation of ammonia. The Kellogg Reformer (100) uses natural gas as a fuel source for the process and a combination of natural gas and steam as reactants during the process. While natural gas is a cleaner burning fuel that other fuel sources, it can be expensive to acquire and utilize on a regular basis. As shown in Prior Art FIG. 1, fuel (110) and a combination of natural gas and steam (120) is introduced into the primary reformer (130), which contains a plurality of catalyst tubes (140). Flue gas (150) exits from the primary reformer (130), while at the same time, fuel (160) for the secondary reformer (170) travels from the primary reformer (130) into the secondary reformer (170) and is mixed with air (180). Reformed gas (190) then exits the secondary reformer (170).

In addition, natural gas primarily comes from the breakdown of fossils in the earth's crust, which is obviously neither a renewable or consistent resource. Other sources of natural gas are so-called "unconventional" resources, which includes "deep natural gas", "tight natural gas", "Devonian shale gas", "coalbed methane", "geopressurized zones" and "methane hydrates". All of these sources are considered "unconventional", because they are either difficult to reach or extract or not certain to produce large quantities of natural gas.

Therefore, it would be ideal to find a more cost-efficient fuel source which can displace at least part of the natural gas required for the process to run. In addition to being cost-efficient, ideal fuels and fuel sources should be a) renewable and/or a consistent resource (e.g. biogenic fuels), b) easy to use, c) easy to transport and d) relatively "clean" with respect to the amount of time/resources it requires to convert the fuel to a "useable" form.

SUMMARY OF THE SUBJECT MATTER

A chemically-modified mixed fuel has been produced, wherein at least part of the fuel is a) cost-efficient, b) renewable and/or a consistent resource (e.g. biogenic fuels), c) easy to use, d) easy to transport and e) relatively "clean" with respect to the amount of time/resources it requires to convert the fuel to a "useable" form.

Specifically, a chemically-modified mixed fuel has been developed that comprises methane gas from at least two methane-production sources. In addition, this chemically-modified mixed fuel can be utilized in any process that incorporates a Kellogg Primary Reformer.

A method for producing the chemically-modified mixed fuel described herein comprises a) providing a first methane-containing gas from a first methane-production source, b) providing a second methane-containing gas from a second methane-production source, c) blending the first methane-containing gas with the second methane-containing gas at a suitable pressure to form a chemically-modified mixed fuel. In additional embodiments, at least one additional methane-containing gas can be provided from at least one additional methane-production source and blended with the chemically-modified fuel.

BRIEF DESCRIPTION OF THE FIGURES

Prior Art

DETAILED DESCRIPTION

Figure 1:
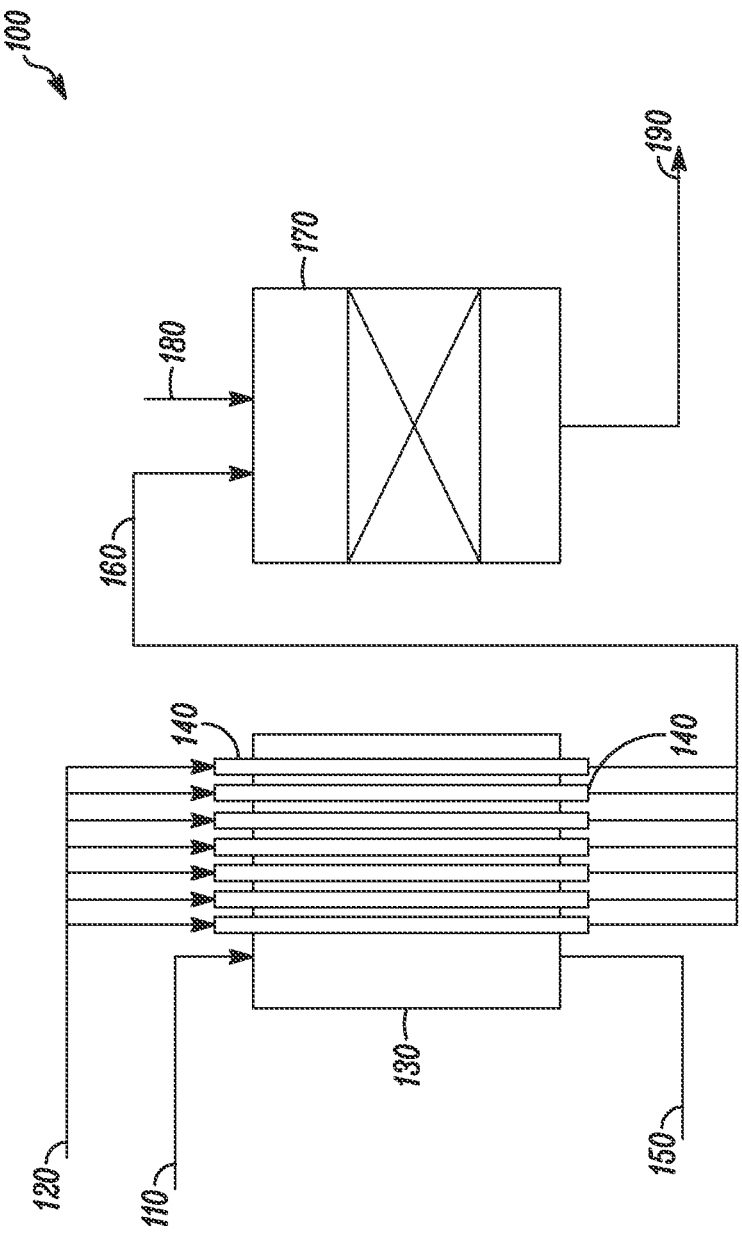
FIG. 1 shows a contemplated Kellogg Reforming Exchanger System

A chemically-modified mixed fuel has been produced, wherein at least part of the fuel is a) cost-efficient, b) renewable and/or a consistent resource (e.g. biogenic fuels), c) easy to use, d) easy to transport and e) relatively "clean" with respect to the amount of time/resources it requires to convert the fuel to a "useable" form.

Specifically, a chemically-modified fuel has been developed that comprises methane gas from at least two methane-production sources. In addition, this chemically-modified fuel can be utilized in any process that incorporates a Kellogg Primary Reformer.

A "methane-production source", as it sounds, is used herein to describe a source of methane gas and/or methane gas production. Contemplated "methane-production sources" may comprise a general natural gas source, a fossil fuel source, a biogenic fuel source, such as a landfill, an abiogenic source, an "unconventional" source, such as those described herein previously or a combination thereof. In some embodiments, a first methane-production source comprises a fossil fuel source and a second methane-production source comprises a landfill. First and second gas streams that comprise methane come from the first methane-production source and second methane-production source respectively. The at least one methane-production source produces gas and/or gas streams that comprise natural gas, Area-6 gas, landfill gas or a combination thereof.

The gas streams that come from each of the methane-production sources are contemplated to comprise various components, in addition to methane. It should be understood, however, that methane is a significant component of each gas stream. For example, typical natural gas from a fossil fuel source comprises 70-90% of methane, 0-20% of propane, 0-8% of carbon dioxide, 0-0.2% of oxygen, 0-5% of nitrogen, 0-5% of hydrogen sulphide and trace amounts of rare gases, such as argon, helium, neon or xenon. Landfill gas from a biogenic fuel source generally comprises about 45-50% of methane, about 35% of carbon dioxide about 12% of nitrogen, about 1-4% of oxygen, and trace amounts of ethane, propane, isobutane, n-butane, isopentane and other organics. The heat value of landfill gas is approximately 500 BTU's/scf (standard cubic foot), which is about half the heat value of natural gas. In fuel applications, approximately one scf of landfill gas will displace ½ scf of natural gas.

The fuel industry has recognized landfill gas as a viable fuel alternative. There are about 120 landfill gas projects in the United States wherein landfill gas is being utilized as an alternative fuel source. As solid waste decomposes in the landfill, methane and carbon dioxide gases are produced. Some landfills, such as the Waverly landfill, increase the decomposition rate in the landfill by reclaiming the landfill's leachate and applying it on the landfill's contents. As the gas is generated, large underground pockets are formed, which eventually will percolate to the surface and discharge to the environment. To prevent this environmental problem, landfills have historically captured the gas before it reaches the surface and burned it in a flare.

A method for producing the chemically-modified mixed fuel described herein comprises a) providing a first methane-containing gas from a first methane-production source, b) providing a second methane-containing gas from a second methane-production source, c) blending the first methane-containing gas with the second methane-containing gas at a suitable pressure to form a chemically-modified mixed fuel. In additional embodiments, at least one additional methane-containing gas can be provided from at least one additional methane-production source and blended with the chemically-modified fuel. Therefore, in the chemically-modified fuels produced herein, there will be at least two methane-containing gas streams that are combined to form the fuel.

In one contemplated embodiment, a chemically-modified fuel is produced specifically for use in a Kellogg Primary Reformer. As a fuel, natural gas is burned in three places within the Kellogg facility—the primary reformer arch burners, the primary reformer tunnel burners and the auxiliary boiler. The auxiliary boiler provides supplemental high-pressure steam that is used as a process reactant and to provide mechanical work in various turbine-driven machines locally. The tunnel burners provide supplemental heat to the primary reformer furnace, and the arch burners are the main source of heat for the reaction of methane and water occurring in the primary reformer.

The auxiliary boiler burns approximately 3000 scfm (standard cubic feet per minute) of 100% natural gas. The firing of this boiler is tightly controlled to maintain a consistent total steam rate and pressure. The tunnel burners consume approximately 800 scfm of 100% natural gas. The firing of the tunnel burners is controlled automatically based on the desired temperature within the convection section of the furnace. The arch burners consume a blend of approximately 2000 scfm of "Area-6 recycle gas", which comprises 43% hydrogen, 40% nitrogen and 17% methane and about 8000 scfm of natural gas. The firing of the arch burners is controlled automatically to maintain the desired temperature in the radiant section of the furnace.

Figure 2:
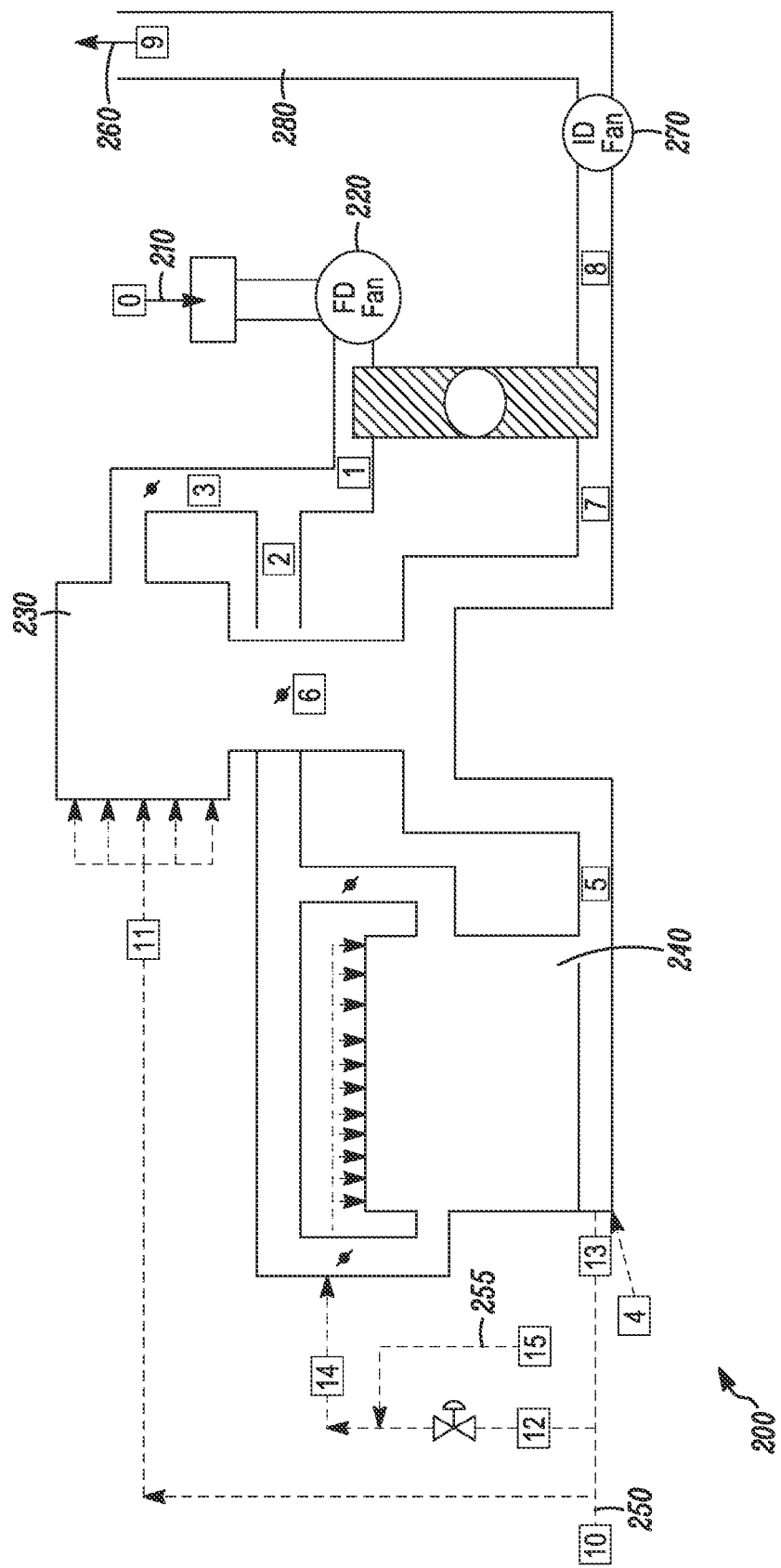
FIG. 2 shows a contemplated Kellogg System.

Combustion air is provided to the three burner applications via a single forced draft (FD) fan and duct system. The combustion flue gases from the three burner applications combine in a common duct system where process heaters and a combustion air pre-heater recover heat from the flue gas stream, as it is pulled from the furnace via a single induced draft (ID) fan and exits through a single stack. FIG. 2 shows the fuel/flue gas system described herein. In this Figure, combustion air (210) is provided into the system (200) by a forced draft fan and duct arrangement (220), as previously described. This air (210) travels to the auxiliary boiler (230) and the primary reformer (240). Natural gas (250) is introduced to the system (200) as the fuel source, with "Area-6 gas" (255) also introduced in the natural gas stream (250) for the primary reformer (240). The flue gas stream (260) is pulled from the furnace via a single induced draft fan (270) and exits through a stack (280). Tables 1 and 2 are directly related to the process shown in FIG. 2, in that the numbers 1-15 shown in FIG. 2 are shown also in Tables 1 and 2. The data measured at those locations are also presented in Tables 1 and 2.

TABLES 1 and 2

| | | \multicolumn{5}{c|}{Combustion Air and Flue Gas System} | | | | |
|---|---|---|---|---|---|---|
| | | | | Stream Number | | |
| Component | MW | 0 | 1 | 2 | 3 | 4 |
| Nitrogen | 28.0 | 77.50% | 77.50% | 77.50% | 77.50% | 77.50% |
| Carbon Dioxide | 44.0 | 0.10% | 0.10% | 0.10% | 0.10% | 0.10% |
| Carbon Monoxide | 28.0 | 0.00% | 0.00% | 0.00% | 0.00% | 0.00% |
| Oxygen | 32.0 | 20.80% | 20.80% | 20.80% | 20.80% | 20.80% |
| Argon | 40.0 | 0.90% | 0.90% | 0.90% | 0.90% | 0.90% |
| Water | 18.0 | 0.70% | 0.70% | 0.70% | 0.70% | 0.70% |
| Total | | 100.00% | 100.00% | 100.00% | 100.00% | 100.00% |
| Mol Weight | | 28.886 | 28.886 | 28.886 | 28.886 | 28.886 |
| Total Mole | MPH | 19420 | 19420 | 14100 | 5320 | 1391 |
| Total Wgt | lb/hr | 560963 | 560963 | 407287 | 153677 | 40194 |
| Std Volume | SCFM | 122669 | 122669 | 89064 | 33605 | 8790 |
| Actual Volume | ACFM | 127387 | 257429 | 187812 | 70865 | 9132 |
| Excess Air | % | | | 10% | 10% | 10% |
| Excess O2 | % | | | 2.1% | 2.1% | 2.1% |
| Pressure | "H2O | 0.0 | 7.0 | 5.0 | 5.0 | −0.2 |
| Temperature | Deg F. | 80 | 650 | 650 | 650 | 80 |

TABLES 1 and 2-continued

| Component | Stream Number | | | | |
|---|---|---|---|---|---|
| | 5 | 6 | 7 | 8 | 9 |
| Nitrogen | | | | | |
| Carbon Dioxide | | | | | |
| Carbon Monoxide | | | | | |
| Oxygen | | | | | |
| Argon | | | | | |
| Water | | | | | |
| Total | | | | | |
| Mol Weight | 27.71 | 27.82 | 27.74 | 27.74 | 27.74 |
| Total Mole | 17150 | 5822 | 22972 | 22972 | 22972 |
| Total Wgt | 475305 | 161978 | 637283 | 637283 | 637283 |
| Std Volume | 108330 | 36775 | 145105 | 145105 | 145105 |
| Actual Volume | 502685 | 140509 | 332676 | 212204 | 202309 |
| Excess Air | | | | | |
| Excess O2 | | | | | |
| Pressure | −0.5 | −5.5 | −11.00 | −19.0 | 0.0 |
| Temperature | 1950 | 1500 | 700 | 265 | 265 |

Total Primary Reformer Heat Input: 513.0 MBTU/Hr
Total Auxiliary Boiler Heat Input 175.0 MBTU/Hr
BTU/Burner 3.03 MBTU/Hr Fuel Gas System

| Component | MW | LHV | HHV | Stream Number | | | | | | |
|---|---|---|---|---|---|---|---|---|---|---|
| | | | | 10 | 11 | 12 | 13 | 14 | 15 | Pri Tot |
| Nitrogen | 28.0 | 0.0 | 0.0 | 1.00% | 1.00% | 1.00% | 1.00% | 9.98% | 32.00% | 9.31% |
| Oxygen | 32.0 | 0.0 | 0.0 | 0.00% | 0.00% | 0.00% | 0.00% | 0.00% | 0.00% | 0.00% |
| Carbon Dioxide | 44.0 | 0.0 | 0.0 | 0.00% | 0.00% | 0.00% | 0.00% | 0.00% | 0.00% | 0.00% |
| Carbon Monoxide | 28.0 | 321.0 | 321.0 | 0.00% | 0.00% | 0.00% | 0.00% | 0.00% | 0.00% | 0.00% |
| Methane CH4 | 16.0 | 911.0 | 1012.0 | 94.30% | 94.30% | 94.30% | 94.30% | 74.23% | 25.00% | 75.72% |
| Ethane C2H6 | 30.0 | 1622.0 | 1773.0 | 2.50% | 2.50% | 2.50% | 2.50% | 1.78% | 0.00% | 1.83% |
| Propane C3H8 | 44.1 | 2322.0 | 2524.0 | 1.00% | 1.00% | 1.00% | 1.00% | 0.71% | 0.00% | 0.73% |
| Butane C4H10 | 58.1 | 3018.0 | 3271.0 | 1.00% | 1.00% | 1.00% | 1.00% | 0.71% | 0.00% | 0.73% |
| Hydrogen | 2.0 | 275.0 | 325.0 | 0.20% | 0.20% | 0.20% | 0.20% | 12.59% | 43.00% | 11.68% |
| Water | 18.0 | 0.0 | 0.0 | 0.00% | 0.00% | 0.00% | 0.00% | 0.00% | 0.00% | 0.00% |
| Total | | | | 100.00% | 100.00% | 100.00% | 100.00% | 100.00% | 100.00% | 100.00% |
| MW | | | | 17.14 | 17.14 | 17.14 | 17.14 | 16.18 | 13.82 | 16.25 |
| Net LHV | BTU/SCF | | | 954 | 954 | 954 | 954 | 778 | 346 | 791 |
| Net HHV | BTU/SCF | | | 1057 | 1057 | 1057 | 1057 | 865 | 393 | 879 |
| Total Mole | MPH | | | 1737 | 484 | 1126 | 127 | 1585 | 459 | 1712 |
| Total Wgt | lb/hr | | | 29781 | 8302 | 19308 | 2171 | 25653 | 6345 | 27824 |
| Std Volume | SCFM | | | 10973 | 3059 | 7114 | 800 | 10014 | 2900 | 10814 |
| Heat Input | KBTU/Min | | | 10463 | 2917 | 6784 | 763 | 7787 | 1003 | 8550 |
| Pressure | PSIG | | | 135 | 10 | 135 | 10 | 75 | 75 | 75 |
| Temperature | Deg F. | | | 60 | 60 | 360 | 360 | 279 | 80 | 100 |
| A/F Ratio | | | | | 10.99 | | 10.99 | 8.89 | | 9.05 |

Contemplated chemically-modified fuel produced for use in this Kellogg Primary Reformer comprises methane-containing gas from a natural gas source and methane-containing gas from a biogenic gas source. The biogenic gas source in this example is a landfill. Only the fuel portion of the natural gas is displaced with landfill gas in this case. The use of landfill gas to displace a portion of the natural gas will significantly reduce the Kellogg Primary Reformer's fuel costs, not to mention the fact that landfill gas can be considered a "renewable resource". A detailed example showing this particular embodiment is shown in the Examples Section as Example 1. Practical considerations and typical equipment arrangements are also disclosed in the Examples section.

Figure 3:
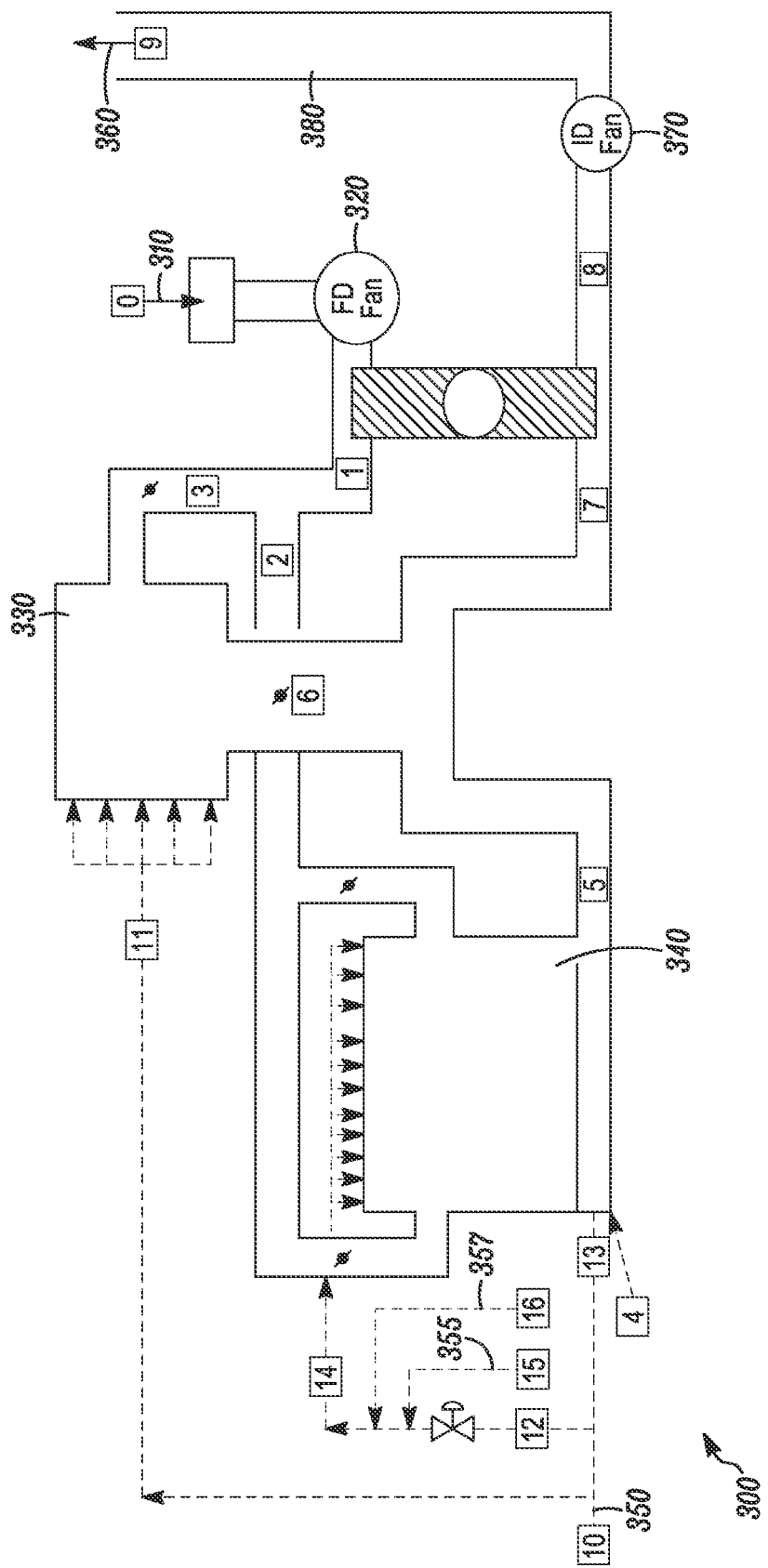
FIG. 3 shows a contemplated Kellogg System wherein landfill gas is introduced to form a chemically-modified mixed fuel.

FIG. 3 shows an updated arrangement of FIG. 2, including a landfill gas stream. In this Figure, combustion air (310) is provided into the system (300) by a forced draft fan and duct arrangement (320), as previously described. This air (310) travels to the auxiliary boiler (330) and the primary reformer (340). Natural gas (350) is introduced to the system (300) as the fuel source, with "Area-6 gas" (355) and Land Fill Gas (357) also introduced in the natural gas stream (350) for the primary reformer (340). The flue gas stream (360) is pulled from the furnace via a single induced draft fan (370) and exits through a stack (380). Tables 3 and 4 are directly related to the process shown in FIG. 3, in that the numbers 1-16 shown in FIG. 3 are shown also in Tables 3 and 4. The data measured at those locations are also presented in Tables 3 and 4.

TABLES 3 and 4

| Combustion Air and Flue Gas System | | | | | | | |
|---|---|---|---|---|---|---|---|
| | | | | Stream Number | | | |
| Component | MW | 0 | 1 | 2 | 3 | 4 | |
| Nitrogen | 28.0 | 77.50% | 77.50% | 77.50% | 77.50% | 77.50% | |
| Carbon Dioxide | 44.0 | 0.10% | 0.10% | 0.10% | 0.10% | 0.10% | |
| Carbon Monoxide | 28.0 | 0.00% | 0.00% | 0.00% | 0.00% | 0.00% | |
| Oxygen | 32.0 | 20.80% | 20.80% | 20.80% | 20.80% | 20.80% | |
| Argon | 40.0 | 0.90% | 0.90% | 0.90% | 0.90% | 0.90% | |
| Water | 18.0 | 0.70% | 0.70% | 0.70% | 0.70% | 0.70% | |
| Total | | 100.00% | 100.00% | 100.00% | 100.00% | 100.00% | |
| Mol Weight | | 28.886 | 28.886 | 28.886 | 28.886 | 28.886 | |
| Total Mole | MPH | 19420 | 19420 | 14099 | 5320 | 1391 | |
| Total Wgt | lb/hr | 560954 | 560954 | 407277 | 153677 | 40194 | |
| Std Volume | SCFM | 122667 | 122667 | 89062 | 33605 | 8790 | |
| Actual Volume | ACFM | 127385 | 257425 | 187808 | 70865 | 9132 | |
| Excess Air | % | | | 10% | 10% | 10% | |
| Excess O2 | % | | | 2.1% | 2.1% | 2.1% | |
| Pressure | "H2O | 0.0 | 7.0 | 5.0 | 5.0 | −0.2 | |
| Temperature | Deg F. | 80 | 650 | 650 | 650 | 80 | |

| | Stream Number | | | | |
|---|---|---|---|---|---|
| Component | 5 | 6 | 7 | 8 | 9 |
| Nitrogen | | | | | |
| Carbon Dioxide | | | | | |
| Carbon Monoxide | | | | | |
| Oxygen | | | | | |
| Argon | | | | | |
| Water | | | | | |
| Total | | | | | |
| Mol Weight | 25.59 | 27.82 | 26.15 | 26.15 | 26.15 |
| Total Mole | 17372 | 5822 | 23194 | 23194 | 23194 |
| Total Wgt | 444616 | 161978 | 606594 | 606594 | 606594 |
| Std Volume | 109734 | 36775 | 146508 | 146508 | 146508 |
| Actual Volume | 509198 | 140509 | 335894 | 214257 | 204266 |
| Excess Air | | | | | |
| Excess O2 | | | | | |
| Pressure | −0.5 | −5.5 | −11.0 | −19.0 | 0.0 |
| Temperature | 1950 | 1500 | 700 | 265 | 265 |

Total Primary Reformer Heat Input: 513.0 MBTU/Hr
Total Auxiliary Boiler Heat Input 175.0 MBTU/Hr
% Change in FD Fan Suction Flow 0.00% Decrease in Flow as Compared to As Is Case
% Change in ID Fan Suction Flow 0.97% Increase in Flow as Compared to As Is Case
CO2 Available in Land Fill Gas: 113.3 TPD

| Fuel Gas System | | | | | | |
|---|---|---|---|---|---|---|
| | | | | Stream Number | | |
| Component | MW | LHV | HHV | 10 | 11 | 12 |
| Nitrogen | 28.0 | 0.0 | 0.0 | 1.00% | 1.00% | 1.00% |
| Oxygen | 32.0 | 0.0 | 0.0 | 0.00% | 0.00% | 0.00% |
| Carbon Dioxide | 44.0 | 0.0 | 0.0 | 0.00% | 0.00% | 0.00% |
| Carbon Monoxide | 28.0 | 321.0 | 321.0 | 0.00% | 0.00% | 0.00% |
| Methane CH4 | 16.0 | 911.0 | 1012.0 | 94.30% | 94.30% | 94.30% |
| Ethane C2H6 | 30.0 | 1622.0 | 1773.0 | 2.50% | 2.50% | 2.50% |
| Propane C3H8 | 44.1 | 2322.0 | 2524.0 | 1.00% | 1.00% | 1.00% |
| Butane C4H10 | 58.1 | 3018.0 | 3271.0 | 1.00% | 1.00% | 1.00% |
| Hydrogen | 2.0 | 275.0 | 325.0 | 0.20% | 0.20% | 0.20% |
| Water | 18.0 | 0.0 | 0.0 | 0.00% | 0.00% | 0.00% |
| Total | | | | 100.00% | 100.00% | 100.00% |
| MW | | | | 17.14 | 17.14 | 17.14 |
| Net LHV | BTU/SCF | | | 954 | 954 | 954 |
| Net HHV | BTU/SCF | | | 1057 | 1057 | 1057 |
| Total Mole | MPH | | | 1493 | 484 | 882 |
| Total Wgt | lb/hr | | | 25593 | 8302 | 15120 |
| Std Volume | SCFM | | | 9430 | 3059 | 5571 |
| Heat Input | KBTU/Min | | | 8992 | 2917 | 5312 |
| Pressure | PSIG | | | 135 | 10 | 135 |
| Temperature | Deg F. | | | 60 | 60 | 360 |
| Gas Density | lb/ft^3 | | | 0.4607 | 0.0760 | 0.2921 |
| Line ID | Inches | | | 6.065 | 6.065 | 7.981 |
| Line Velocity | FPS | | | 76.9 | 151.2 | 41.4 |

TABLES 3 and 4-continued

| | | | | | | |
|---|---|---|---|---|---|---|
| Line Velocity | FPM | | 4615 | 9073 | | 2483 |
| A/F Ratio | | | | 10.99 | | |

| | Stream Number | | | | |
|---|---|---|---|---|---|
| Component | 13 | 14 | 15 | 16 | Pri Tot |
| Nitrogen | 1.00% | 8.84% | 32.00% | 1.00% | 8.33% |
| Oxygen | 0.00% | 0.05% | 0.00% | 0.20% | 0.05% |
| Carbon Dioxide | 0.00% | 11.82% | 0.00% | 45.20% | 11.05% |
| Carbon Monoxide | 0.00% | 0.00% | 0.00% | 0.00% | 0.00% |
| Methane CH4 | 94.30% | 66.10% | 25.00% | 53.45% | 67.94% |
| Ethane C2H6 | 2.50% | 1.23% | 0.00% | 0.05% | 1.31% |
| Propane C3H8 | 1.00% | 0.50% | 0.00% | 0.04% | 0.53% |
| Butane C4H10 | 1.00% | 0.50% | 0.00% | 0.06% | 0.53% |
| Hydrogen | 0.20% | 10.97% | 43.00% | 0.00% | 10.27% |
| Water | 0.00% | 0.00% | 0.00% | 0.00% | 0.00% |
| Total | 100.00% | 100.00% | 100.00% | 100.00% | 100.00% |
| MW | 17.14 | 19.37 | 13.82 | 28.85 | 19.22 |
| Net LHV | 954 | 679 | 346 | 490 | 697 |
| Net HHV | 1057 | 755 | 393 | 545 | 775 |
| Total Mole | 127 | 1816 | 459 | 475 | 1943 |
| Total Wgt | 2171 | 35167 | 6345 | 13703 | 37339 |
| Std Volume | 800 | 11471 | 2900 | 3000 | 12271 |
| Heat Input | 763 | 7787 | 1003 | 1471 | 8550 |
| Pressure | 25 | 75 | 75 | 75 | 0 |
| Temperature | 360 | 236 | 80 | 157 | 0 |
| Gas Density | 0.0775 | 0.2329 | 0.2143 | 0.3915 | |
| Line ID | 3.068 | 7.981 | 6.065 | 12.390 | |
| Line Velocity | 151.6 | 120.7 | 41.0 | 11.6 | |
| Line Velocity | 9099 | 7244 | 2460 | 697 | |
| A/F Ratio | 10.99 | 7.76 | | | 7.97 |

In another embodiment, a chemically-modified mixed fuel can be produced that combines three or more methane-containing gas streams from at least two different sources. It should also be understood that other gas streams—such as recycle gas, inert gases, non-methane-based hydrocarbon gases, etc. can be added to the chemically-modified mixed fuel, as long as there is at least a first methane-containing gas and a second methane-containing gas that are mixed to form the chemically-modified mixed fuel.

In some embodiments, synthetic gases including those that may contain significant amounts of methane, may be utilized alone or in combination with natural, non-synthetic gases. These synthetic gases would need to be able to replace some of the natural gases currently being used in the target process without leading to expensive apparatus modifications or expensive starting materials.

The methane-containing gases utilized in the production of the chemically-modified mixed fuels, along with any other additional gases, should be blended at a suitable pressure in order to address concerns with respect to flow rate and also to address additional pressure considerations needed later in the particular process. For example, the first methane-containing gas may be held at a lower pressure initially in order to affect blending with the second methane-containing gas. Once blended, the chemically-modified mixed gas may then be transported under increasing pressure until reaching the optimum pressure for the particular process—such as the Kellogg process described herein. The suitable pressure does not necessarily refer to the pressure needed for the process that is utilizing the fuel, but instead refers to the pressure needed to optimally blend the gas streams to form the mixed gas fuel.

EXAMPLES

Example 1

The Waverly, Va. Site

Enerdyne Power Systems, Inc. in conjunction with Waverly Gas Producers, LLC has proposed to supply landfill gas to the Honeywell Hopewell Plant (Kellogg site). The source of the landfill gas is the landfill located in Waverly, Va.

Approximately 3000 scfm of landfill gas is currently available to displace approximately 1500 scfm of natural gas in the Kellogg plant. The available landfill gas is used to displace the natural gas being burned in the arch burners of the primary reformer. The arch burners are the best option for the chemically-modified fuels because they already burn a blended fuel stream containing inerts (the A-6 recycle gas described herein). The displaced natural gas volume in this Example is relatively small compared to the total fuel volume and there is minimal risk to process reliability.

In this Example, the price of landfill gas is fixed for the first 18 months at $3.20/DKT, and thereafter, the price of landfill gas will be based on the price of natural gas at that time. The landfill gas price is determined by averaging the current delivered cost of natural gas and the delivered floor price of landfill gas. The total savings expected over the 15-year life of the project for this Example is projected to be $15-30 million.

At the landfill site, multiple vertical wells are utilized under vacuum to extract the gas from the landfill. At the landfill site, the extracted gas will be processed in the following manner:
  Filtration to remove particulate matter
  Carbon filtration to remove siloxane and organics
  Refrigeration to remove water moisture and dry the gas
  Compression for transferring gas through the supply pipeline The gas is then transferred via an 18" pipeline from the landfill site to the Kellogg site. When the landfill gas reaches the Kellogg site, its pressure is approximately 40 psig (pounds per square inch gauge). At this point, the flow rate of the landfill gas is metered for billing purposes. Also, the landfill gas can be sampled and analyzed at this point to review and ensure gas quality and requirements.

An on-site compression station is utilized at this point to increase the pressure of the gas from about 40 psig to a minimum of 75 psig that is required for use in the Kellogg Primary Reformer arch burners. A typical compressor used for this purpose is installed in a modular fashion, with the initial, single compressor powered by one 300 HP, 3600 RPM motor and is designed to handle 4000 scfm of landfill gas. Single compressors can be added over time as the volume of landfill gas is increased.

After compression, the landfill gas passes through a coalescing filter to assure the dryness of the gas before being routed to the Primary Reformer. The landfill gas is then blended with the Reformer's arch burner fuel stream. Table 5 shows the existing and modified fuel flow rates at the initial flow rate of the landfill gas (3000 scfm).

TABLE 5

| Operating Parameter | Initial Scenario | Modified Scenario |
|---|---|---|
| Total Fuel Flow | 10000 scfm | 11500 scfm |
| Natural Gas Flow | 8000 scfm | 6500 scfm |
| Area-6 Recycle Gas Flow | 2000 scfm | 2000 scfm |
| Landfill Gas Flow | 0 scfm | 3000 scfm |
| % Natural Gas | 80% | 57% |
| % Area-6 Recycle Gas Flow | 20% | 17% |
| % Landfill Gas | 0% | 26% |
| Inerts Flow | 800 scfm | 1500 scfm |
| % Inerts | 8% | 20% |
| % Increase in Total Flow | 0% | 15% |
| Natural Gas Displaced | 0 scfm | 1500 scfm |
| % Natural Gas Displaced | 0% | 19% |

At 3000 scfm of landfill gas, the combustion air requirement is expected to be similar to existing conditions. Specifically, the calculated combustion air requirement for landfill gas is 0.40% less than existing conditions. The total volume of flue gas will not significantly change with landfill gas. Specifically, the total volume of flue gas will increase by only about 0.61%.

At the initial volume of landfill gas (3000 scfm), the following updates will be to be made to a conventional system:
  Replacement of burner tips
  Installation of tie-in for landfill gas
  Installation of electronic over-speed trip capability on the ID and FD fans
  Installation of various instrumentation and controls As the volume of landfill gas increases, the following updates should be considered:
  Piping size increase from blend point to burners
  ID fan capacity increase
  Installation of balancing ball valves for splitting flow in each of the arch burners
  Installation of an additional fuel header and control valves on the Reformer
  Installation of future blend point for tunnel burners
  Ties into additional fuel gas systems Primary Equipment List/Specifications This list of equipment and specifications is for illustrative purposes and should provide enough information to one of ordinary skill in the art to practice the subject matter disclosed herein.

GC-21 On-Site Landfill Gas Compressor: Vilter Model VSSG-1501 oil flooded screw compressor, 4000 scfm capacity, 30 psig suction, 75 psig discharge. The compressor is capable of a continuous 100 psig discharge. In addition, the compressor has a 300 HP, 3600 RPM, 4160 VAC, 3 phase capacity. A Modicon PLC control panel is included.

John Zinc Arch Burner Assemblies: Model FFC-PC-10; quantity 154.

Fuel Tie-ins and Isolation Valves

Instrumentation, Control Logic and Piping

The overall goal is to burn all of the landfill gas that is available all of the time. The capacity of the landfill gas compressor will be controlled from the skid-mounted Modicon PLC controller utilizing the slide valve (essentially an internal recycle valve) on the compressor and an external recycle valve.

To allow the new compressor to maximize the landfill gas being used, a split pressure control system will be used. If the discharge pressure reaches 85 psig, the compressor will go to recycle control and will hold a fixed discharge pressure at approximately 85 psig. When the discharge pressure falls below 85 psig, the compressor will switch over to suction pressure control and will then control to a suction pressure set point (preliminarily set for 20 psig). This control will all be done by the PLC-based control system supplied with the compressor.

The process effluent temperature from the primary reformer will continue to be controlled by TIC-117 cascading to HFC-2700 (BTU controller), cascading to FIC-778 (natural gas fuel to the primary reformer). The BTU calculation is modified to include the energy input from the landfill gas in the calculation (it currently includes the Area-6 return gas and the natural gas to the primary reformer). This control scheme will allow for constant BTU supply to the reformer with any (or no) landfill gas flow.

A double block and bleed system is installed in the landfill gas line similar to that which is installed into the Area-6 return gas line. This system will activate via a single solenoid valve to positively block off the landfill gas flow to the fuel system. The double block and bleeds will trip and will close HV-721A and HV-721B and open HV-721C on the following conditions:
  High oxygen content (>4.0% on AI-720A or AI-720B)
  High Temperature (>350° F. on TI-721)
  GC-21 Status=Down/Trip
  Reformer Trip (DCS or Hardware—Anytime V-101A/C are tripped or FCV-778 is closed)

Piping and Instrumentation Process Conditions:
  Fluid (Gas): Landfill Gas
  Composition (Mole %):
  Methane (53.45%)
  Carbon Dioxide (45.20%)
  Nitrogen (1.00%)
  Oxygen (0.20%)
  Ethane (0.05%)
  Propane (0.04%)
  Isobutane (0.03%)
  n-Butane (0.02%)
  Isopentane (0.01%)
  100% Total
  Average Molecular Weight: 28.879
  Mixture Cp/Cv Ratio: 1.212

Process Conditions—Compressor Suction:
  Pressure: 30 psig normal (design pressure 60 psig)
  Temperature: 70° F.

Process Conditions—Compressor Discharge:
  Pressure: 75 psig normal (design pressure 280 psig)
  Temperature: 157° F.
  Line Size: 12" SCH 10S 304 LSS, HP Spec. 5210
Natural Gas Piping for Purging Purposes:
  2" 5210 to just upstream of restriction orifice. Increase to 4" 5210 at restriction orifice inlet.
  Restriction orifice is 4", 300# flanges, 0.723" orifice (designed to pass 2000 scfm maximum at a 250 psig inlet pressure).
Natural Gas Relief Valve on Purge Supply:
  This relief valve will protect the landfill gas suction piping from natural gas overpressurization when purging back to the landfill. This valve should be a 2J3 for natural gas service. Set pressure is 60 psig.
Energy and Utility Requirements
Electrical Supply:
  1 300-HP motor; 3 phase, 4160 VAC, 60 Hz
  1 10-HP motor for oil pump; 3 phase, 480 VAC, 60 Hz
  1 7.5-HP motor for oil cooler and recycle cooler fan; 3 phase, 460 VAC, 60 Hz
  1 2-HP motor for oil system charge pump; 3 phase, 460 VAC, 60 Hz
Instrument Air:
  Less than 10 scfm required
Process Sewer:
  The compressor has a suction scrubber that discharges moisture to drain. Little to no moisture is expected to be present.
Practical Considerations:
  The loss of landfill gas pressure is seen because of on-site compression failure. On-site compression failure could cause low gas pressure at the burners resulting in a plant trip. The natural gas control valve, which is upstream of the blending point, is designed to control the desired pressure at the burners. In the event of loss of on-site landfill gas compression, the natural gas control valve will open to provide the additional fuel required for maintaining adequate pressure.
  The loss of landfill pressure could also occur because of off-site compression failure at the landfill site, for example. This risk can be minimized by providing adequate notification and adjustment points along the pipeline at designated points. In addition, the existing natural gas control valve system is designed to compensate for the loss of landfill gas flow.
  Supply piping corrosion may also occur as a function of moisture content in the landfill gas and its dew point. This concern can be addressed by the use of HDPE piping underground and installation of the coalescing filter to remove traces of moisture in the gas. Also, exiting the on-site compressor, the temperature of the landfill gas will be approximately 160° F.—well above its dew point.
  Landfill gas comprises 1-4% oxygen. Since Area-6 return gas or Kellogg purge gas (when Cryo is down) contain hydrogen, there is a concern regarding the hydrogen explosion limits of the blended fuel stream. Computer modeling was utilized to determine the potential for explosion under a worst case scenario: 4% oxygen in landfill gas and Kellogg burning 6000 scfm purge gas with 70% hydrogen. The results of the computer modeling indicate that the addition of air (additional oxygen) is required to combust the blend of gases, and therefore, the stream is not explosive. In order to address this concern, redundant oxygen analyzers have been installed to monitor the oxygen content of the landfill gas. Interlocks have been set up to trip the double block and bleed system that will stop the flow of landfill gas if an oxygen content of 4% or greater is detected on either analyzer. Thermocouples have also been installed in multiple locations that will also trip the landfill gas should a high temperature be reached—which indicates combustion within the pipe. If high oxygen is detected, it will be necessary to purge the piping of the gas prior to reintroduction into the fuel gas system. This reintroduction can be accomplished by using natural gas to push the landfill gas backward through the pipeline into the landfill. A restriction orifice has been sized to allow a maximum of 2000 scfm of natural gas for this purpose. Since the natural gas is at a normal supply pressure of 250 psig, a relief valve will be set for 60 psig and can pass in excess of 2400 scfm.

Deposition in the radiant and convection sections of the Primary Reformer furnace is addressed by the removal of siloxane from the landfill gas. Siloxane is a compound contained in many consumer products, and therefore, it can be found in landfills. The siloxane contaminates the landfill gas, and when combusted, forms a fine, white dust on furnace surfaces. If the furnace surface temperature exceeds 1900° F., the white siloxane dust transforms into an adherent glassy compound. This deposition will severely foul the process heat transfer coils within the convection section and force a Kellogg shutdown. The coils may also have to be replaced, as a result of the deposition, which would lead to a prolonged shutdown.

Thus, specific embodiments and applications of chemically-modified fuels, their uses and their methods of production have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A fuel burning process, comprising the steps of:
   providing a first methane-containing gas from a first methane production source at a first, relatively higher pressure;
   providing a second methane-containing gas from a biogenic methane production source at a second, relatively lower pressure;
   pressurizing the second methane-containing gas from the second pressure toward the first pressure;
   blending the first methane-containing gas with the second methane-containing gas to form a chemically-modified mixed fuel; and
   combusting the chemically-modified mixed fuel in arch burners of a primary reformer of a Kellogg Primary Reformer System.

2. The process of claim 1, further including, after said blending step and prior to said combusting step, the additional step of:
   pressurizing the chemically-modified mixed fuel to a pressure higher than the first pressure.

3. The process of claim 2, wherein said step of pressurizing the chemically-modified mixed fuel further comprises pressurizing the chemically-modified mixed fuel to a pressure of at least 75 psig.

4. The process of claim 1, wherein said blending step further comprises blending a third, additional methane-containing gas, provided from at least one additional methane production source, into the chemically-modified mixed fuel.

5. The process of claim 1, wherein the first methane production source comprises at least one fossil fuel source, at least one abiogenic source or a combination thereof.

6. The process of claim 1, wherein a percentage of methane in said second gas is greater than about 40%.

7. The process of claim 6, wherein the percentage of methane in said second gas is between 45-50%.

8. The process of claim 6, wherein the percentage of methane in said first gas is greater than about 70%.

9. The process of claim 6, wherein the percentage of methane in said first gas is between 70-90%.

10. The process of claim 1, wherein the second methane containing gas is landfill gas.

11. A fuel burning process, comprising the steps of:
providing a first methane-containing gas from a first methane production source;
providing a second methane-containing gas from a biogenic methane production source;
blending the first methane-containing gas with the second methane-containing gas at a first ratio to form a chemically-modified mixed fuel;
combusting the chemically-modified mixed fuel in arch burners of a primary reformer of a Kellogg Primary Reformer System to provide an energy output; and
adjusting the first ratio of said blending step based on variations in at least one of pressure and heating value of the second methane-containing gas to maintain the energy output.

12. The process of claim 11, wherein the second methane containing gas is landfill gas.

13. The process of claim 11, wherein:
said step of providing a second methane-containing gas further comprises providing the second methane-containing gas at a first, relatively lower pressure; and
said blending step further comprises blending the first methane-containing gas with the second methane-containing gas at a second, relatively higher pressure.

14. The process of claim 11, wherein said blending step further comprises blending a third, additional methane-containing gas, provided from at least one additional methane production source, into the chemically-modified mixed fuel.

15. The process of claim 11, further including, after said blending step and prior to said combusting step, the additional step of:
pressurizing said chemically-modified mixed fuel to a pressure of at least 75 psig.

16. The process of claim 11, wherein the first methane production source comprises at least one fossil fuel source, at least one abiogenic source or a combination thereof.

17. The process of claim 11, wherein a percentage of methane in said second gas is greater than about 40%.

18. The process of claim 17, wherein the percentage of methane in said second gas is between 45-50%.

19. The process of claim 17, wherein the percentage of methane in said first gas is greater than about 70%.

20. The process of claim 17, wherein the percentage of methane in said first gas is between 70-90%.

* * * * *